United States Patent [19]

Clevenger et al.

[11] Patent Number: 5,161,945
[45] Date of Patent: Nov. 10, 1992

[54] TURBINE ENGINE INTERSTAGE SEAL

[75] Inventors: Lloyd L. Clevenger; Robert C. Rowan, Jr., both of Phoenix, Ariz.

[73] Assignee: Allied-Signal Inc., Morris Township, Morris County, N.J.

[21] Appl. No.: 595,335

[22] Filed: Oct. 10, 1990

[51] Int. Cl.⁵ .............................................. F01D 5/08
[52] U.S. Cl. .................... 415/177; 415/178; 60/39.36
[58] Field of Search ................ 415/177, 178; 60/39.36

[56] References Cited

U.S. PATENT DOCUMENTS

| | | |
|---|---|---|
| 1,400,323 | 12/1921 | Sherbondy . |
| 2,013,499 | 9/1935 | Meckenstock . |
| 2,296,702 | 9/1942 | Butler ................... 415/177 |
| 2,748,568 | 6/1956 | Budworth ............. 60/39.36 |
| 2,792,197 | 5/1957 | Wood ..................... 415/177 |
| 2,938,659 | 5/1960 | Judson ................... 415/177 |
| 3,046,648 | 7/1962 | Kelly . |
| 3,115,011 | 12/1963 | Deinhardt .............. 60/760 |
| 3,116,908 | 1/1964 | Wosika ................... 415/143 |
| 3,263,424 | 8/1966 | Birmann . |
| 3,647,311 | 3/1972 | Wootton et al. . |
| 3,965,699 | 6/1976 | Bracken ................ 60/39.36 |
| 4,009,568 | 3/1977 | King ...................... 60/39.32 |
| 4,087,199 | 5/1978 | Hemsworth et al. . |
| 4,135,851 | 1/1979 | Bill et al. . |
| 4,296,937 | 10/1981 | Handa . |
| 4,449,714 | 5/1984 | Meier . |
| 4,932,207 | 6/1990 | Harris ................... 60/39.36 |
| 5,033,263 | 7/1991 | Shekleton .............. 60/39.36 |
| 5,074,111 | 12/1991 | Harris et al. . |

FOREIGN PATENT DOCUMENTS

| | | |
|---|---|---|
| PCT/US89/- 05274 | 11/1989 | European Pat. Off. . |
| 762097 | 5/1954 | Fed. Rep. of Germany . |
| 750597 | 6/1956 | United Kingdom ............... 415/177 |

*Primary Examiner*—Edward K. Look
*Assistant Examiner*—Therese M. Newholm
*Attorney, Agent, or Firm*—Terry L. Miller; Jerry J. Holden; Robert A. Walsh

[57] ABSTRACT

A turbine engine includes axially adjacent compressor and turbine rotors which define a groove therebetween. Into the groove between the rotors radially extends an annular interstage seal assembly. The seal assembly includes a thermally insulative cellular wall structure which resists thermal and pressure included distortions. At its radially inner extent the cellular wall defines a seal structure in cooperation with the rotors, and also carries heat shield members on an axial fore disposed toward the turbine rotor.

21 Claims, 5 Drawing Sheets

TURBINE ENGINE INTERSTAGE SEAL

BACKGROUND OF THE INVENTION

The present invention is in the field of sealing apparatus and method for use in a turbine engine. More particularly the present invention relates to a seal structure employed in a turbine engine wherein the engine includes a centrifugal compressor receiving ambient air and pressurizing this ambient air for delivery to a combustor; and a turbine disposed in back-to-back relationship with the compressor and receiving combustion products formed by combustion of a fuel in the pressurized air supplied by the compressor. Historically such turbine engines have employed a disk-like centrifugal compressor rotor and a similar disk-like radial inflow turbine disposed in back-to-back relationships such that they cooperatively define therebetween a radially inwardly extending annular groove. At the radially inner extent of the annular groove the turbine and compressor rotors cooperatively carry a seal runner, or centering ring, which served as a concentricity maintaining structure with respect to the turbine and compressor rotors respectively.

A housing structure of the turbine engine conventionally carries a disk-like annular seal member extending radially inwardly into the annular groove between the compressor rotor and turbine rotor, and at its radially inner extent carrying a seal structure. The seal structure may be perhaps, of a labyrinth type, sealingly engaging the seal runner, which is carried cooperatively by the compressor rotor and turbine rotor. Generally speaking, these conventional seal structures were made of sheet metal stampings of comparatively light gage and have been subject to a variety of shortcomings because of their structural nature.

By way of example, the annular sealing structure is subjected to an axial force because of the fluid pressure differential thereacross existing between the discharge of the centrifugal compressor and the inlet pressure at the radial inflow turbine. This pressure differential causes the relatively flexible conventional sheet metal seal structure to be displaced axially in a direction towards the turbine rotor. Additionally the seal structure is subjected to a radial temperature differential resulting from the flow of hot gasses radially inwardly and across the turbine rotor. The hot gas flow provides a heating input to the annular seal structure which is most pronounced at its radially outer extent and decreases progressively radially inwardly therefrom. On the other hand the seal structure is subjected to a comparative cooling effect on the compressor side thereof as a result of the small portion of compressor discharge airflow which circulates in the backspace between the compressor rotor and the adjacent face of the annular seal structure. Because of this differential radial heating and cooling on opposite faces of the seal structure, conventional seal structures have displayed a warping or buckling similar to that experienced with the bottom of a frying pan which is heated most intensely in the center and is cooler at its outer periphery.

Such seal structures, due to this differential thermal expansion experienced in the radial direction of the structure, will in one location warp in one axial direction and in an adjacent location may warp or displace in the opposite axial direction. In the case of the conventional annular seal structure such warping and displacements superimposed upon the axial displacements which resulted from differential pressures across the seal structure results in axial as well as radial movements at the center opening of the seal structure whereat sealing integrity is to be maintained.

Further, the heat input to the seal structure may be circumferentially nonuniform. Thus, the seal structure will have a nonuniform circumferential and radial temperature distribution. This circumferentially nonuniform temperature distribution further contributes to warping of the seal structure. As a result, the labyrinth or other conventional seal structure which is carried at the center opening of the interstage seal is displaced axially as well as radially and sealing integrity is generally not successfully maintained by conventional interstage seals of the type described above.

A result of the axial, radial, and warping displacements experienced by conventional seal structures has been the necessity to provide larger than desired clearances between the turbine back face and the seal structure. Consequently, a portion of the combustion products flowing radially inwardly onto the turbine are lost into the excessive clearance provided at the seal structure. Turbine efficiency is adversely affected by this loss of a portion of the combustion products. Also, the heat input to the seal structure is increased as energy input to and efficiency of the turbine is decreased by excessive seal assembly clearances.

Accordingly, it is an object for the present invention to provide a seal assembly of the type described which resists axial, radial, and warping displacements; and which also allows decreased turbine back face clearances.

The present invention realizes the objects thereof by providing a turbine engine having an improved seal structure, said turbine engine comprising; a compressor section inducting ambient air and delivering this air pressurized to a combustor, means introducing fuel to said pressurized air in said combustor to maintain combustion providing a flow of high-temperature pressurized combustion products, and a turbine section expanding said combustion products toward ambient to extract shaft power therefrom, said compressor section including a centrifugal compressor rotor, and said turbine section including a radial in-flow turbine rotor, said compressor rotor and said turbine rotor being disposed in back-to-back relation so that air flowing to said compressor rotor and combustion products flowing from said turbine rotor flow in a single axial direction and said rotors define an annular groove extending radially inwardly therebetween, said improved seal structure comprising a cellular annular impermeable wall member carried by said turbine engine and extending radially into said groove to there sealingly cooperate with said rotors, said cellular wall member having a circumferentially arrayed plurality of axially extending cells therein.

Figure 1:
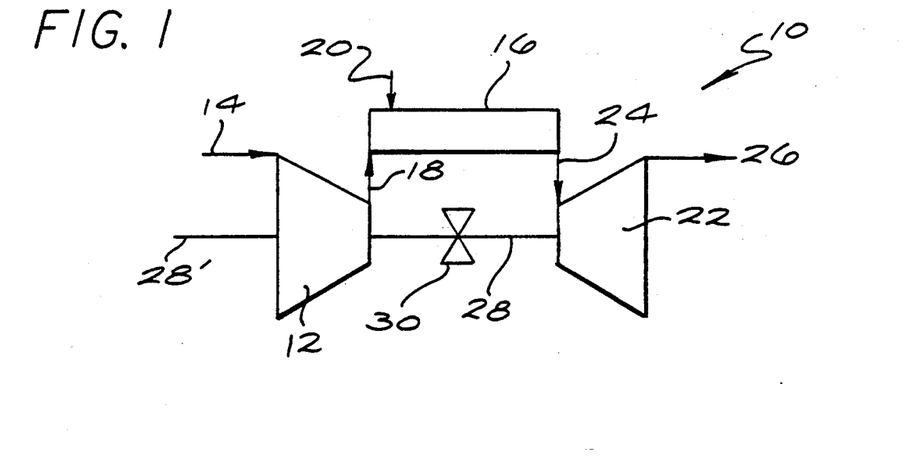
FIG. 1 presents a system schematic of a turbine engine including a seal member according to the present invention.

FIG. 1 provides a schematic presentation of a turbine engine 10 embodying the present invention. In order to gain a generalized overview of the operation of the turbine engine 10, it is necessary to note that the engine 10 includes a dynamic compressor section 12 which in operation ingests ambient air, as indicated by arrow 14, and delivers this air pressurized to a combustor section 16, as is indicated by arrow 18. A flow of fuel is added to the pressurized air in combustor section 16, as indicated by arrow 20. Combustion maintained within the combustor section 16 provides a flow of high temperature pressurized combustion products. These combustion products flow to a turbine section 22 (as is indicated by arrow 24) wherein they are expanded toward ambient pressure and discharged (as is indicated by arrow 26) to produce shaft power. The turbine section 22 drives a shaft 28 which in turn drives the dynamic compressor section 12. The shaft 28 includes an externally extending portion 28' whereby the turbine engine 10 may deliver shaft power to an external power-consuming device (not shown).

Between the compressor section 12 and turbine section 22, a seal apparatus 30 is disposed about the shaft 28 and cooperates therewith to substantially prevent flow of pressurized air from compressor section 12 to turbine section 22 along the shaft 28. That is, because of the seal apparatus 30, substantially all of the air pressurized by compressor section 12 flows to turbine section 22 via the combustor 16.

Figure 2:
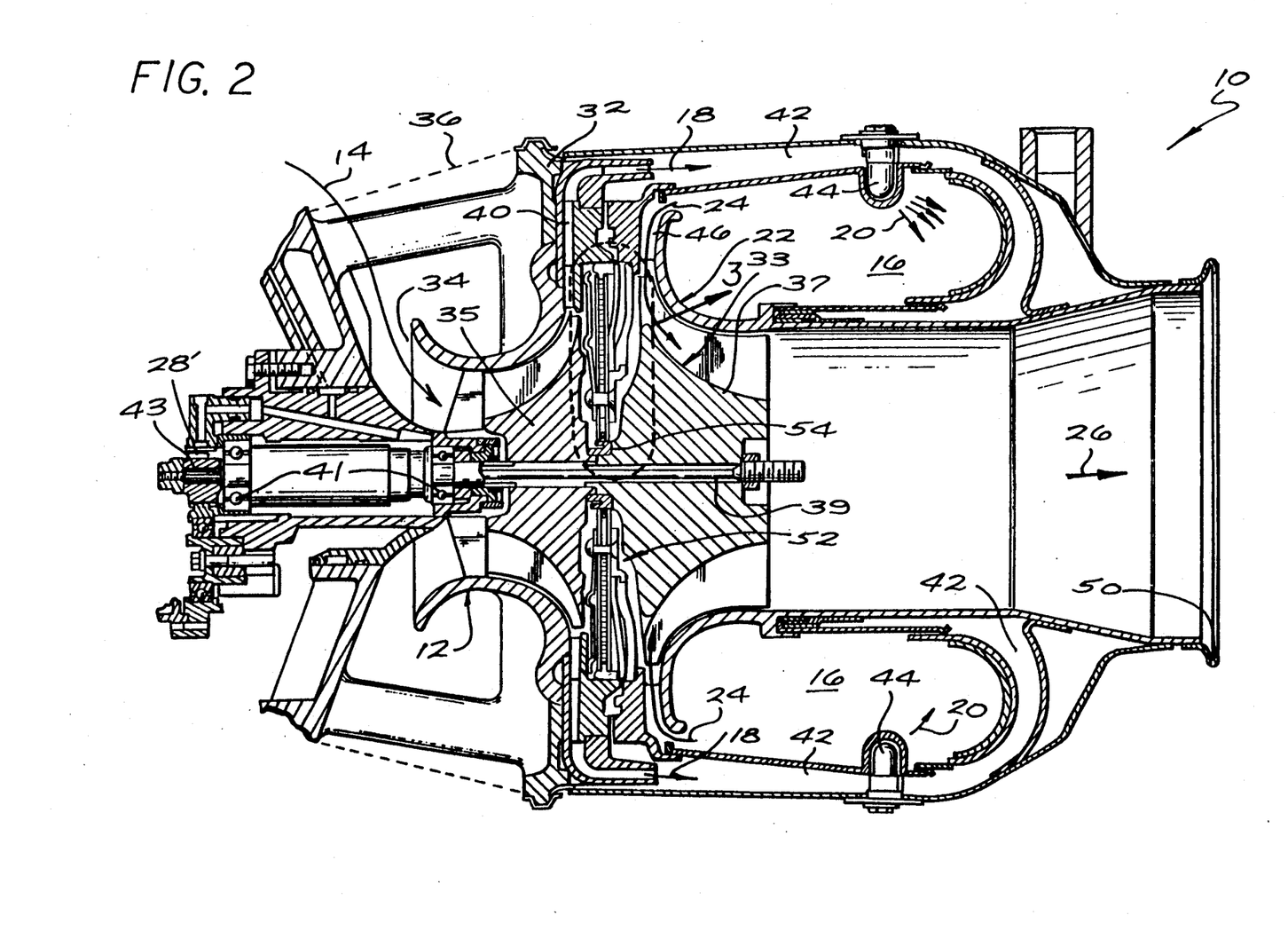
FIG. 2 provides a longitudinal cross sectional view through a turbine engine as depicted schematically in FIG. 1, and including a seal member embodying the present invention.

In viewing FIG. 2, it will be seen that the turbine engine 10 includes a housing generally referenced with the numeral 32. The housing 32 defines an inlet 34 opening to ambient air via an inlet screen 36, and through which a flow of ambient air (arrow 14) is received. The housing 32 journals a rotor member generally referenced with the numeral 33. Rotor 33 includes a compressor rotor portion 35, a turbine rotor portion 37, and an elongate tie bolt 39. Cooperatively, the portions 33, 35, tie bolt 39, and an externally extending shaft portion 28' substantially complete the rotational assembly 38 of the engine 10, recalling the schematic depiction of FIG. 1. The rotational assembly is journaled in housing 32 by a pair of angular contact bearings 41 which sustain both radial and thrust loads. At its left end, viewing FIG. 2, the shaft portion 28' includes a splined drive coupling portion 43 whereby shaft power is transferred from engine 10 to, for example, a power distribution gear box (not shown).

The compressor rotor member 35 is rotatably received in the housing 32 and receives thereon the inlet flow of ambient air 14. Rotor member 35 delivers the received air pressurized (arrow 18) via a diffuser structure 40 into a pressurized air plenum 42. The plenum 42 surrounds combustor 16, which includes outer perforate walls allowing air flow inwardly thereof from the plenum 42.

Carried by the housing 32 and extending inwardly through the plenum 42 and into combustor 16 is a plurality of fuel delivery nozzles 44, only two of which is visible viewing FIG. 2. The nozzles 44 deliver a spray of fuel (arrow 20) into the combustor 16 so that combustion is maintained therein. Combustion products flow from combustor 16 to turbine section 22 (arrow 24) via a nozzle member 46. The turbine section 22 includes the radial in-flow turbine rotor 37 which, as noted previously, is disposed in back-to-back relation with the centrifugal compressor rotor 35. The turbine rotor 37 rotatably extracts shaft power from the combustion products 24, which are then exhausted from the engine 10 via an exhaust duct opening 50 (arrow 26).

Figure 3:
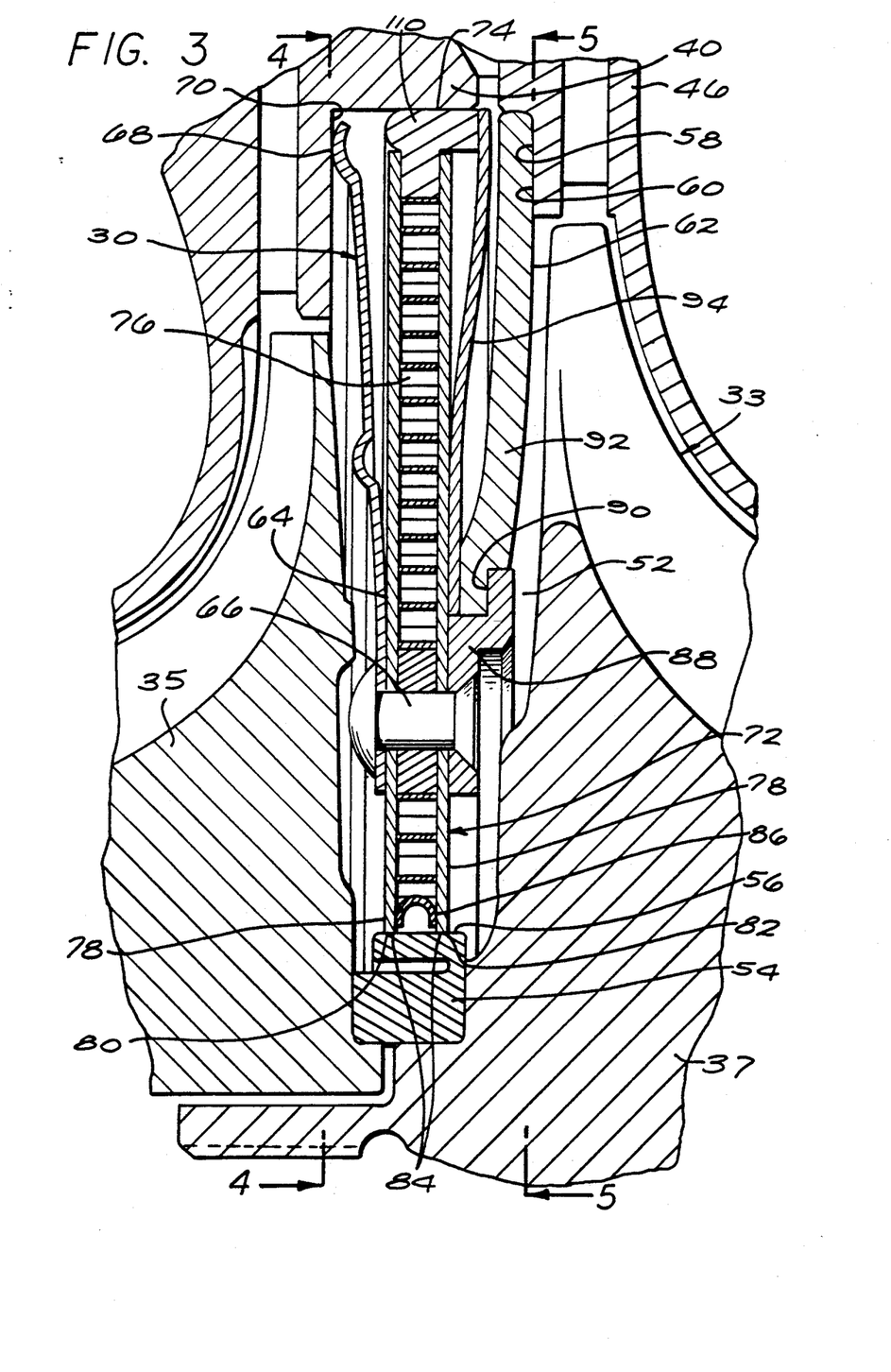
FIG. 3 provides an enlarged fragmentary longitudinal cross sectional view of an encircled portion of FIG. 2.
Figures 4, 5:
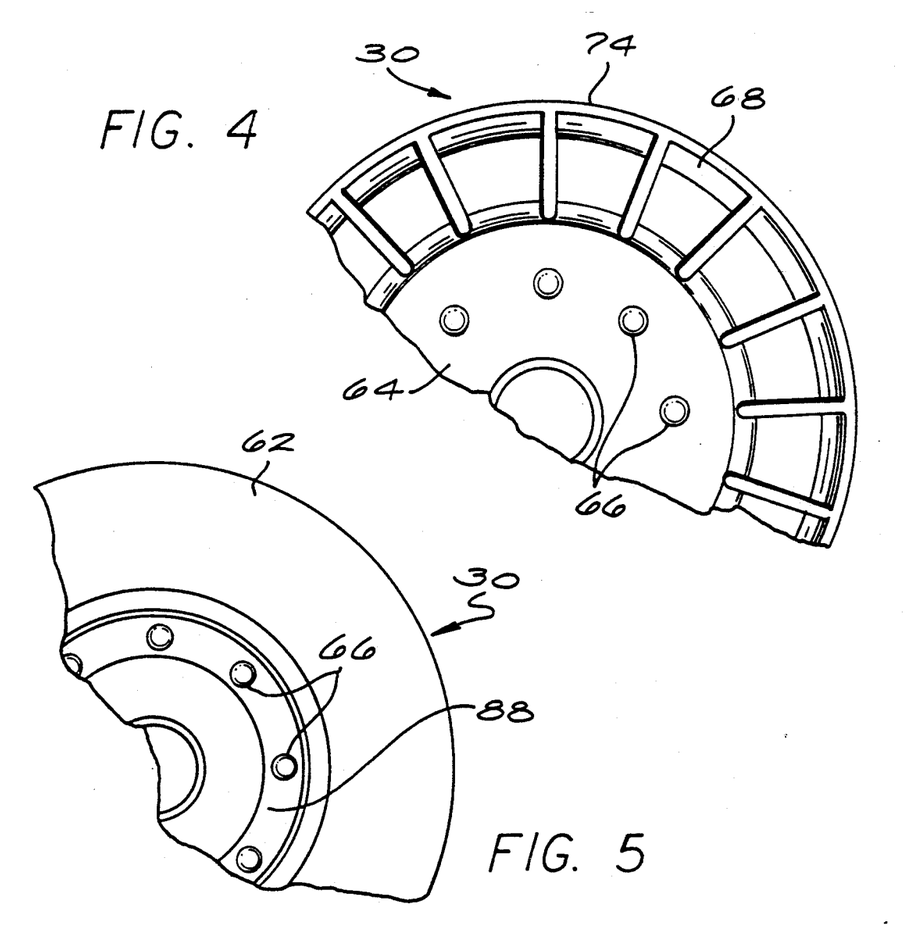
FIGS. 4 and 5 each provide respective fragmentary views of opposite axial faces of the seal member depicted in FIGS. 2 and 3.

Viewing FIGS. 3-5, it is seen that the compressor rotor 35 and turbine rotor 37 are disposed in back-to-back relation. In other words, fluid flow approaching compressor rotor 35, and fluid flow departing turbine rotor 37 moves in the same axial direction. The rotors 35 and 37 define an inwardly extending radial groove 52 therebetween, which groove leads to and terminates at a piloting ring 54 received between the rotors 35 and 37. The piloting ring 54 assists in maintaining mutual concentricity of the rotor members 35 and 37, and also defines a radially outwardly disposed outer surface 56.

The housing 12 defines a radially inwardly disposed annular groove 58 axially between the diffuser 40 and the turbine nozzle 46. The groove 58 is axially coextensive with the groove 52 so that the two grooves 52 and 58 are radially congruent.

Carried in the groove 58 and extending radially inwardly into groove 52 is an annular seal assembly generally referenced with the numeral 30. Recalling that the source of pressurized air in the engine 10 is compressor section 12, it is apparent that seal assembly 30 is exposed on its left face to pressurized air from compressor 12, and is exposed on its right face to lower pressure, but higher temperature, combustion products from combustor 16. Consequently, the seal assembly 30 at an axially disposed radially outer marginal annular face 62 thereof is pressure biased axially into sealing engagement with the housing 32 at an axially disposed annular shoulder 60 of groove 58.

In order to resiliently bias the seal assembly 30 toward the shoulder 60, the assembly 30 includes an annular spring member 64. The spring member 64 is disposed on the cool side of seal assembly 30 toward compressor 12, and is attached at its radially inner margin to the assembly 30 by a plurality of rivets 66. The spring member 64 may be circumferentially continuous like a Belleville spring, or may include, as depicted, a plurality of resilient finger portions 68, only one of which is visible on FIG. 3. The spring member 64 extends radially outwardly to engage a shoulder 70 of housing groove 58, which shoulder 70 is disposed axially opposite to shoulder 60.

Importantly, the seal assembly 30 includes an annular wall member, generally referenced with the numeral 72. At its radially outer margin, the wall member 72 includes an axially thickened rim portion 74 which is received closely but axially movably in the groove 58. Extending radially inwardly from the rim portion 74 the wall 72 includes an axially thick, in comparison to conventional seals, wall portion 76, which wall portion is substantially cellular, as will be seen. The wall portion 76 extends inwardly to piloting ring 54 whereat an axially spaced apart pair of face sheets 78 of the wall 72 each define one of a pair of axially aligned openings (80, 82). At the respective openings 80, 82, each of the face sheets 78 define a respective radially disposed surface 84 which is in close but radially spaced running relation with the outer surface 56 of piloting ring 54. Consequently, the wall 72 cooperates with the piloting ring to inhibit fluid flow from compressor 12 to turbine 22 along the shaft 28. The two axially spaced surfaces 84 of the openings 80, 82 function somewhat like a knife-edge or labyrinth seal to inhibit fluid leakage between the wall 72 and piloting ring 54.

Because of the cellular nature of the wall 72 intermediate of the two face sheets, the wall portion 76 includes a ring member 86. This ring 86 is generally U-shaped in cross section, and circumscribes the piloting ring 54 radially spaced outwardly thereof. The ring 86 is sealingly secured to each of the face sheets 78 so that fluid pressure leakage into the cells of wall 72, as well as liquid permeation into these cells, is prevented.

Attached to the wall 72 by the same rivets which secure the spring member 64 thereto, but on the opposite side of the wall from the spring 64, is an annular bracket member 88. The bracket member 88 cooperates with the wall 72 to define a radially outwardly disposed annular recess 90. Received movably in the recess 90, and in the groove 58 of housing 32 adjacent the shoulder 60, is an annular turbine back face shroud member 92. The back face shroud member 92 defines the annular face 62 which is urged axially into sealing contact with the shoulder 60 by spring 64 and by differential air pressure when the engine 10 is operating. The bracket 88 allows relatively free radial movement of the turbine back face shroud member 92 relative to wall 72, but restricts axial relative movement to the extent of a relatively small clearance (not shown) therebetween. As will be explained, the back face shroud member 92 is also urged axially into engagement with the bracket member 88.

Also received into the recess 90 and in groove 58 along with the turbine back face shroud member 92 is an annular radiation heat shield member 94. The members 92 and 94 are axially spaced apart over most of their radial dimension. Like the turbine back face shroud 92 the radiant shield 92 is relatively movable in the recess 90. However, the radiant shield member 92 is itself cone shaped like a Belleville spring. At its radially outer margin the shield member 94 engages the rim portion 74. At its radially inner margin, the turbine back face shroud member 94 engages the inner extent of the back face shroud member 92 to urge the latter into engagement with the bracket member 88.

Figures 6, 7:
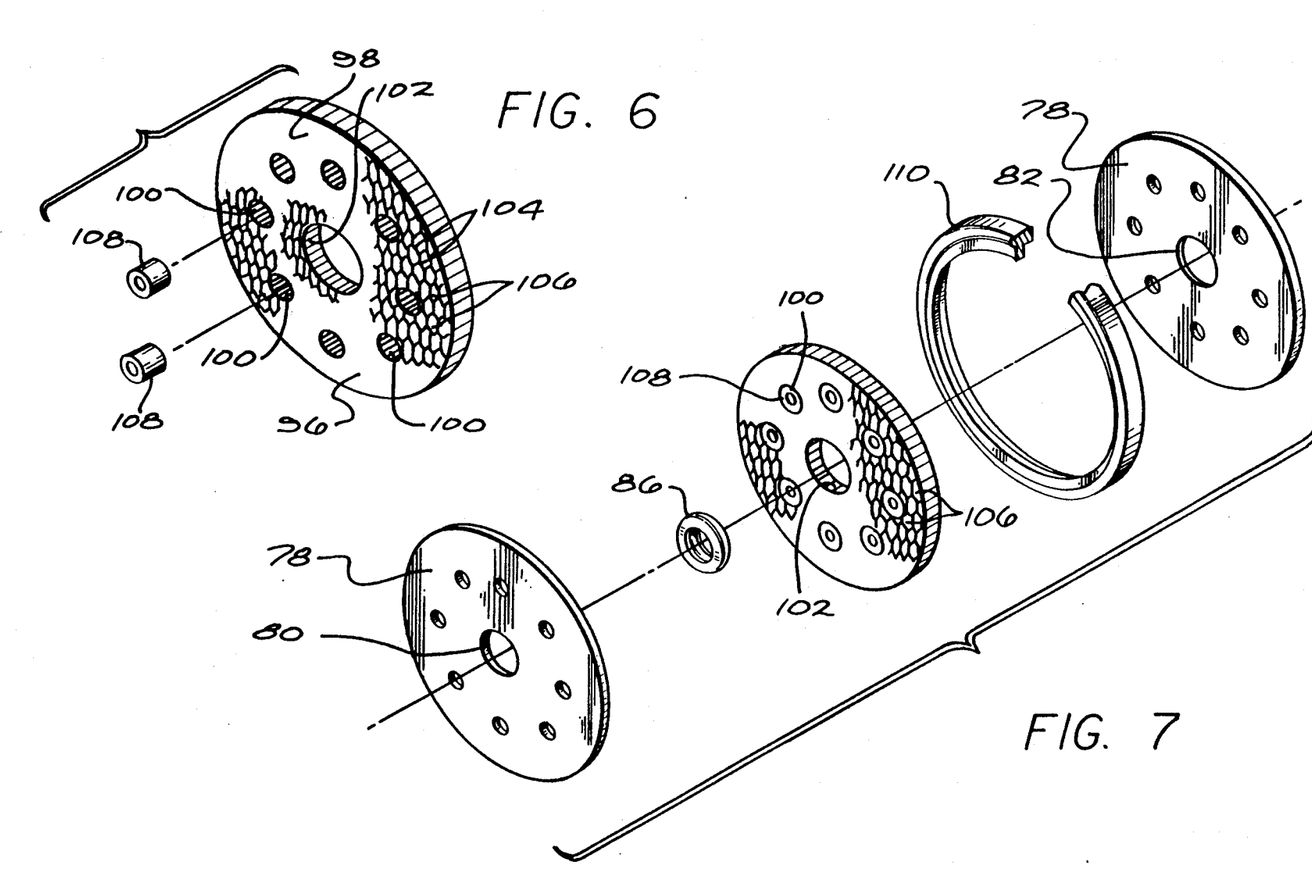
FIGS. 6, 7, and 8 are exploded perspective views showing steps in the process of making a seal structure as shown in the preceding drawing Figures.
Figure 8:
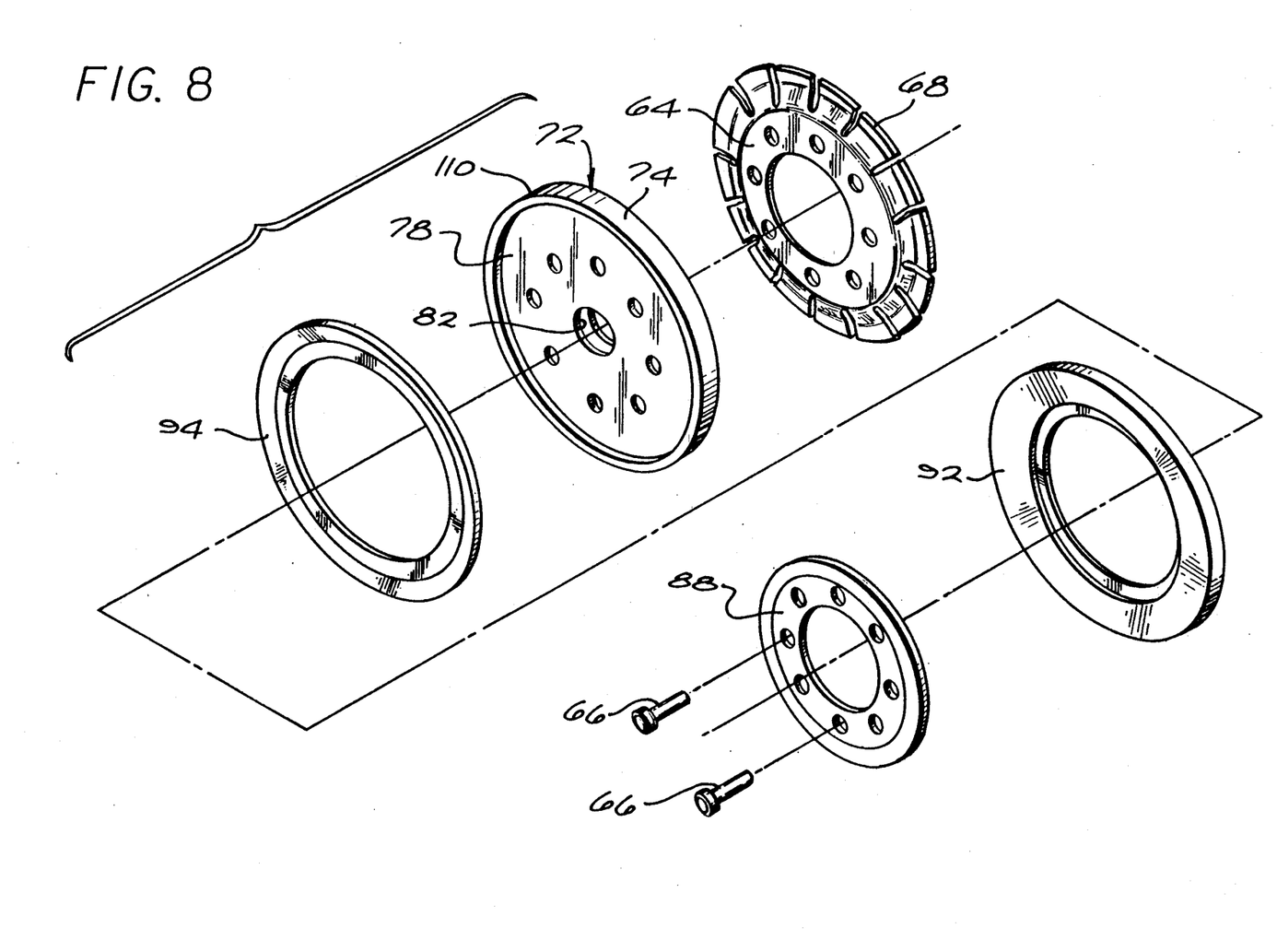

Turning now to FIGS. 6-8, steps in the process of making the seal member 30 are depicted. FIG. 6 depicts an annulus 96 of honeycomb material 98. The annulus 96 is formed from a larger body of honeycomb material and has an outer diameter slightly smaller than that of seal 30, an inner diameter slightly larger than ring 86, and a plurality of circumferentially spaced openings 100 therethrough spaced outwardly of the central opening 102 thereof. In addition, the honeycomb material 98 itself includes a plurality of fine-dimension walls, generally referenced with the numeral 104 which extend substantially perpendicularly to the plane of the annulus 96. The fine-dimension walls 104 cooperatively define a regular repetitive geometric array of cells 106 extending through the annulus 96.

Viewing FIG. 7, it is seen that the ring member 86 is received into the central opening 102 of the honeycomb wall 96. At each of the openings 100 the honeycomb wall 96 receives one of a matching plurality of annular reinforcing grommet members 108. The annulus 96 is itself received into a ring member 110, which at its outer perimeter defines the rim 74. After the annulus 96, ring 86, grommets 108, and outer ring member 110 are united, for example, by brazing, then the face sheets 78 are united with the previously described components. This operation of uniting the face sheets 78 with the previously brazed components of wall 72 may be carried out in a brazing furnace by use of a brazing foil interposed between the sheets 78 and honeycomb annulus 96. Consequently each of the fine dimension walls 106 is structurally coupled to the face sheets 78 at its juncture therewith. This coupling of the fine dimension walls 106 with the face sheets 78 results in an extremely stiff structure for the wall 72.

Finally, FIG. 8 depicts the assembly of spring member 64 with wall 72 and bracket 88 by means of rivets 66. The bracket member 88 captures the back face shroud member 92 and radiant heat shield member 94 so that these members are retained movably in cooperation with the wall member 72. The reinforcing grommets 108 allow the rivets 66 to be headed without crushing the fine-dimension wall structure 104 of the honeycomb material.

Returning briefly to a consideration of how the seal 30 functions in engine 10 during operation of the latter, it will be recalled that an air pressure differential urges the seal 30 rightwardly. This air pressure differential tends to bow the wall portion 72 so that the center part thereof moves axially toward the turbine rotor 48. However, the wall 72 composed of the two face sheets 78 and fine-dimension honeycomb material 98 extending therebetween is very stiff so that virtually no bowing of the wall 72 occurs. This high degree of stiffness of the wall 72 also results in the wall member 72 resisting buckling in response to circumferentially nonuniform temperatures which might be imposed upon the seal 30. However, the turbine back face shroud 92 is relatively massive so that it also assists in leveling any circumferentially nonuniform temperatures. Additionally, the back face shroud member 92 is free to move radially relative to the wall member 72 so that temperature cycling and circumferential nonuniformities which cause physical excursions of the back face shroud member 92 do not result in stresses being transmitted to wall member 72. Finally, the radiant heat shield member 94 additionally assists in isolating the cellular wall member 72 from the severe high-temperature conditions in the adjacent turbine section 22. The result of all of the above is that the radially inner periphery of seal assembly does not experience the physical dislocations and excursions in physical position with changing operations of the engine 10, as do conventional interstage seals. Consequently, the engine 10 may be designed with a closer clearance between the turbine rotor 37 and the back face shroud member 92. An improved efficiency and power output result for the engine 10.

What is claimed is:

1. A turbine engine having an improved seal structure, said turbine engine comprising; a compressor section inducting ambient air and delivering this air pressurized to a combustor, means introducing fuel to said pressurized air in said combustor to maintain combustion providing a flow of high-temperature pressurized combustion products, and a turbine section expanding said combustion products toward ambient to extract shaft power therefrom, said compressor section including a centrifugal compressor rotor, and said turbine section including a radial in-flow turbine rotor, said compressor rotor and said turbine rotor being disposed in back-to-back relation so that air flowing to said compressor rotor and combustion products flowing from said turbine rotor flow in a single axial direction and said rotors define an annular groove extending radially inwardly therebetween, said improved seal structure comprising a cellular annular impermeable wall member carried by said turbine engine and extending radially into said groove to there sealingly cooperate with said rotors, said cellular wall member having a circumferentially arrayed plurality of axially extending cells therein.

2. The invention of claim 1 wherein said cellular annular wall member includes an impermeable annular face sheet on one side thereof, said face sheet closing said plurality of cells at one axial end thereof and sealingly cooperating with said rotors.

3. The invention of claim 1 wherein said cellular annular wall member includes a pair of impermeable annular face sheets at opposite faces thereof, said pair of face sheets closing said plurality of cells at opposite ends thereof and sealingly cooperating with said rotors at respective axially spaced locations.

4. The invention of claim 1 wherein said cellular wall member carries an annular turbine back face shroud member interposed between said turbine rotor and said cellular wall member.

5. The invention of claim 4 wherein said cellular wall member and said annular turbine back face shroud member define cooperating captive retention means for securing said turbine back face shroud member to said cellular wall member with free radial relative movement while restricting relative axial movement therebetween.

6. The invention of claim 5 wherein said cooperating captive retention means includes one of said cellular wall member and turbine back face shroud member defining a radially disposed annular recess adjacent the inner margin of the latter, the other of said cellular wall member and turbine back face shroud member defining an annular radially extending flange portion which is received captively into said recess for radial relative movement while limiting axial relative movement to a limited clearance dimension.

7. The invention of claim 4 further including an annular radiant heat shield member interposing axially between said cellular wall and said turbine back face shroud member and over a medial radial portion thereof being axially spaced from each of said cellular wall member and said turbine back face shroud member.

8. The invention of claim 4 further including resilient means for urging said seal structure axially relative to said turbine engine to a determined axial position.

9. The invention of claim 8 wherein said resilient means includes an annular axially flexible spring member securing to said cellular wall member oppositely said annular turbine back face shroud member.

10. The invention of claim 9 wherein said spring member includes a radially inner annular marginal portion securing to said cellular wall member.

11. The invention of claim 10 wherein said cellular wall member carries a plurality of axially elongate fasteners passing therethrough and at opposite ends thereof engaging said resilient means spring member and said captive retention means to secure these members to said cellular wall member.

12. The invention of claim 11 wherein said cellular wall member receivably carries therewithin a plurality of respective annular grommet members circumscribing individually each of said plurality of fasteners.

13. The invention of claim 1 wherein said cellular wall member includes an axially and radially extending fine-dimension wall structure defining said plurality of axially-extending cells arrayed regularly in said wall member.

14. The invention of claim 13 further including an impermeable annular ring member received centrally of said annular wall member and cooperating sealingly therewith to prevent permeation into the cells thereof of fluids from said turbine engine.

15. A seal assembly for a turbine engine, said seal assembly comprising a cellular annular wall member defining proximate an outer diameter thereof an annular surface sealingly compatible with a relatively nonrotatable housing structure of said turbine engine, said cellular annular wall member extending radially inwardly and impermeably to a central opening thereof, and at said central opening said cellular annular wall member defining a radially disposed annular surface sealingly cooperable with a cylindrical surface receivable rotationally therein to inhibit flow of pressurized fluid therebetween.

16. The invention of claim 15 wherein said seal assembly further includes a comparatively massive and thermally conductive annular turbine back face shroud member carried by said cellular annular wall member proximate an axial face of the latter.

17. The invention of claim 16 further including cooperating means defined by said cellular annular wall member and said turbine back face shroud member proximate a radially inner margin of the latter for permitting free radial relative movement therebetween to an extent accommodating differential thermal expansions while constraining relative axial movement to a determined small value.

18. The invention of claim 17 further including an annular radiant heat shield member interposing axially between said cellular annular wall member and said turbine back face shroud member, said cooperating means further captively retaining said radiant heat shield member relatively movably between said wall member and said turbine back face shroud member.

19. In a turbine engine having a compressor rotor and a turbine rotor cooperatively defining an axially and radially inwardly extending annular gap therebetween, and a housing carrying an annular seal member extending radially inwardly of said gap and cooperating with said rotor members to inhibit fluid flow therebetween, the method of resisting both axial bowing of said seal member in response to fluid pressure loading as well as buckling of said seal member resulting from circumferentially nonuniform heat input thereto, said method comprising the steps of:
 defining a radially extending wall portion of said seal member from fine-dimension cellular structure having one of a pair of impermeable face sheets on opposite axial faces thereof;
 carrying a comparatively massive heat conductive turbine back face shroud member upon said wall portion;
 utilizing said turbine back face shroud member to moderate circumferentially nonuniform heat input to said wall portion; and
 providing cooperating means securing to said wall portion said turbine back face shroud member for free relative radial movement to the extent of differential thermal expansions thereof while limiting relative axial movements therebetween to a comparatively small value.

20. The method of claim 19 further including the steps of employing said fine-dimension cellular structure to define a regular array of axially extending cells in said wall portion, and sealingly securing said pair of face sheets to said fine-dimension structure to close said cells.

21. A seal member for a turbine engine, said seal member comprising a cellular annular wall member having a radially outer marginal edge portion sealingly cooperable with a housing of said turbine engine, a radially inner marginal edge portion sealingly cooperable with a rotatable shaft or runner surface of said turbine engine, and a multi-cellular annular wall portion extending between and connecting said outer and said inner marginal edge portions, said multi-cellular annular wall portion having an inner wall part of radially and axially extending fine-dimension sheet material cooperatively defining multiple axially extending cells arrayed annularly, a first and a second axially spaced annular facing sheets sandwiching said multi-cellular wall portion therebetween and sealingly cooperating therewith to substantially close substantially all of said multiple cells, and an annular closure member extending between said pair of facing sheets proximate said radially inner marginal edge portion to close the remainder of said multiple cells.

* * * * *